April 4, 1967

T. C. BISSOT ET AL 3,312,747

PRODUCTION OF 4-HALOBUTENE-1

Filed Nov. 1, 1963

INLET FEED STREAM:

1,3-DIHALOBUTANE
OF THE FORMULA:
$CH_3-CH-CH_2-CH_2$
   $|$         $|$
   $X$         $X$

WHEREIN X IS Cl OR Br.

REACTION ZONE → CONTACT WITH DEHYDRO-HALOGENATION CATALYST (OPTIONAL STEP):
RECYCLE OF UNREACTED
1,3-DIHALOBUTANE

REACTION PRODUCTS

SEPARATION OF 4-HALOBUTENE-1 PRODUCT

PRODUCT:

4-CHLOROBUTENE-1

OR

4-BROMOBUTENE-1

INVENTORS
THOMAS C. BISSOT
HARRY B. COPELIN

BY John E. Dull

AGENT 3,312,747
PRODUCTION OF 4-HALOBUTENE-1
Thomas C. Bissot, Grand Island, and Harry B. Copelin, Niagara Falls, N.Y., assignors to E. I. du Pont de Nemours and Company, Wilmington, Del., a corporation of Delaware
Filed Nov. 1, 1963, Ser. No. 320,626
12 Claims. (Cl. 260—654)

This invention relates to a preparation of halogenated butenes, and more particularly, to the preparation of 4-chlorobutene-1 and 4-bromobutene-1.

The compounds 4-chlorobutene-1 and 4-bromobutene-1 have considerable commercial value. Being polymerizable through their vinyl groups, by the well-known free radical, ionic or coordination catalysis reactions, these compounds form valuable homopolymers and copolymers with other ethylenically unsaturated monomers. The halogen groups impart useful properties into such polymers, for example, the chlorine groups on the polymer side chains impart fire-resistant properties. If desired, the halogens may be replaced by other functional groups such as cyano, hydroxyl, amino, carboxy, thiol, methylamino, acyloxy, and others, thereby providing a broad spectrum of useful products. These compounds may also be converted to polymers by the familiar epoxidation technique. Furthermore, these compounds are valuable as precursors to other useful materials. For example, 4-chlorobutene-1 may be reacted with hydrogen bromide to effect a reverse addition thereof to thereby obtain 1-bromo-4-chlorobutene. The 1-bromo-4-chlorobutene may then be reacted with sodium cyanide to obtain adiponitrile.

Heretofore, 4-chlorobutene-1 and 4-bromobutene-1 have been available only by complicated, commercially unpractical processes. It is desired to provide a process for the facile preparation of these compounds.

An object of this invention is to provide an improved process for the preparation of 4-chlorobutene-1 and 4-bromobutene-1. Another object is to provide an improved process for the preparation of 4-chlorobutene-1 and 4-bromobutene-1 by the dehydrohalogenation of a 1,3-halobutane. Other objects will be obvious to those skilled in the art from the following description of this invention.

These objects are attained by the present invention which provides the process comprising contacting a 1,3-dihalobutane of the formula

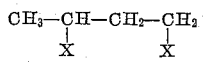

wherein X is halogen selected from the group consisting of chlorine and bromine, with a dehydrohalogenation catalyst at a temperature between the boiling point of the said 1,3-dihalobutane and 500° C., and thereafter separating from the resulting reaction products a 4-halobutene-1 of the formula

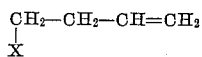

wherein X is a halogen selected from the group consisting of chlorine and bromine.

The drawing is a simplified flow diagram which schematically illustrates the general process of this invention.

The process of this invention whereby a 1,3-dihalobutane is dehydrohalogenated to form a 4-halobutene-1 represents a truly surprising and unexpected discovery. The dehydrohalogenation prior art teaches that dehydrohalogenation follows the well-known Saytzeff's Rule: "Of the isomeric olefins which can be formed from a secondary or tertiary alkyl halide by elimination in the different branches in the alkyl chain, the one actually produced in the greatest proportion is determined by the condition that the eliminated hydrogen is lost preferentially from that carbon which bears the smallest number of hydrogen atoms." Annalen, vol. 179, p. 296, (1875); Fieser and Fieser, Advanced Organic Chemistry, Reinhold Publishing Corp., New York (1961), p. 143; and English and Cassidy, Principles of Organic Chemistry, McGraw-Hill Book Co., (1956) pp. 77–78. Thus, it would be expected that the process of this invention would produce a 4-halobutene-2, not a 4-halobutene-1. This indeed is the result obtained when the next highest dihaloalkane homologue, i.e., 1,4-dihalopentane, is reacted in the process of this invention. That is, the 1,4-dihalopentane dehydrohalogenates to yield a major portion of 5-halobutene-2 instead of 5-halobutene-1.

The 1,3-dihalobutanes which are reacted in the process of this invention have the formula

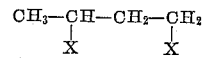

wherein X is a halogen selected from the group consisting of chlorine and bromine. These 1,3-dihalobutanes may be prepared by the isomerization of the corresponding 1,2-dihalobutanes. Such 1,2-dihalobutanes may be prepared by reacting butene-1 with the halogen in the presence of a trace of oxygen. The isomerization is effected by contacting the 1,2-dihalobutane with a Lewis acid at a temperature between the freezing point of the reactant system and 250° C., and thereafter separating the 1,2-dihalobutane from the resulting isomerization products.

In the practice of this invention, the 1,3-dihaloalkane is introduced into a reaction zone i.e., any suitable reaction vessel adapted for a continuous vapor phase operation, and preferably adapted for operation with a fixed bed of catalyst. A dehydrohalogenation catalyst is confined within this reaction zone so that the 1,3-halobutane comes into contact therewith.

Dehydrohalogenation catalysts are well known in the art, being disclosed for example in Ellis, The Chemistry of Petroleum Derivatives, Reinhold Publishing Corp., New York (1937), vol. II, ch. 34, p. 804, and Huntress, Organic Chlorine Compounds, John Wiley and Sons, Inc., New York (1948). Suitable dehydrohalogenation catalysts include alumina, calcium oxide, calcium chloride, barium chloride, nickel chloride, aluminum chloride, aluminum oxide, pumice, pumice containing cupric phosphate, activated carbon, hydrous aluminum silicate (kaolin), calcium phosphate, zirconium oxide, thorium oxide, zinc oxide, and the like. The preferred dehydrohalogenation catalysts for use in this invention are rhodium on alumina and palladium on alumina. These latter catalysts are preferred because of their relatively long active lives. While the other dehydrohalogenation catalysts may be successfully used in the process of this invention, they generally tend to deactivate relatively soon, thereby requiring regeneration or replacement at inconvenient intervals.

The major reaction products obtained by this process are 4-halobutene-1 and 1,3-butadiene with minor amounts of 3-halobutene-1 and 1-halobutene-2. The 4-halobutene-1 may be separated from the resulting reaction products by any suitable means. For example, since the 3-halobutane-1 and 1-halobutene-2 lose a second mole of HCl to form butadiene much more readily than the desired 4-halobutene-1 product, the reaction products may be converted to essentially only 4-halobutene-1 and butadiene. These two components are very easily separated since butadiene is a gas at ordinary conditions while 4-halobutene-1 is a liquid. The butadiene thus produced is a valuable by-product which is readily separated in a pure form.

Since prolonged contact time between the 1,3-dihalobutane and the dehydrohalogenation catalyst tends to produce an excessive proportion of 1,3-butadiene, it is generally preferred to maintain such a contact time as to produce a practical minimum amount of the 1,3-butadiene. This may be accomplished by regulating flow conditions so as to obtain a contact time sufficient to effect a conversion of only 0.1 to 10% by weight of the 1,3-dihalobutane per pass. The precise contact time required for the process of this invention depends upon a number of variables including temperature, catalyst activity, amount of catalyst present, and the particular 1,3-dihalobutane being processed. A particularly preferred species embodies a continous cyclic process whereby the unreacted 1,3-dihalobutane is recycled to the reaction zone. This optional, but preferred, step is shown in the drawing by the broken line leading from the separation step to the reaction zone.

The temperature of the reaction zone should be maintained within the range from the boiling point of the 1,3-dihalobutane to 500° C. Generally, use of relatively high temperature results in a greater proportion of the 4-halobutene-1 and a smaller proportion of the other halobutene isomers being produced, than with relatively low temperatures. However, use of relatively high temperatures usually results in a greater proportion of 1,3-butadiene being produced. The optimum temperature depends primarily on the activity of the catalysts and upon the particular 1,3-dihalobutane being processed. In general, when the process of this invention is used to produce 4-chlorobutene-1 it is preferred that the temperature be within the range of 200 to 300° C., and when the process is used to produce the bromo analogue, it is preferred that the temperature range be from 320 to 385° C.

This invention is further illustrated by the following examples wherein all percentages are in terms of percent by weight, except where noted. The laboratory equipment used in these examples (except as noted in Examples 3 and 4) consisted of a 500 ml. round-bottom flask mounted in a heating mantle, and a vertical glass column mounted in the top of the flask. The lower half of this column was packed with glass beads and heated via windings of Nichrome ribbon directly on the glass column. The upper half of this column, used as the reaction zone was packed with catalyst pellets. A tube connected the top of this glass column to the center of a glass distillation column. The lower section of this distillation column was heated to provide the necesary reflux in the column. The bottom of this column was connected to the flask by a tube adapted to provide a liquid seal. The top of the distillation column was connected to a recovery receiver which was fitted with a Dry Ice reflux condenser. This reflux condenser in turn was connected to a Dry Ice trap and thence to a water scrubber. Thus, this equipment provided a process whereby the 1,3-dihalobutane starting material was boiled in the flask, the vapors thereof further heated in the preheater, and then passed into a reaction zone for contact with the catalyst. The product stream from the reactor was passed to the center of the distillation column. Unreacted 1,3-dihalobutane was returned from the bottom of the distillation column, through the liquid seal, back through the flask. The halobutenes which were produced were taken off the distillation column to the recovery receiver and scrubbers.

*Example 1*

To the flask of the apparatus described above, was charged 389 g. of 1,3-dichlorobutane. This material was vaporized and preheated to 231° C. and then passed through a 70 cc. bed of 0.5% palladium on ⅛ in. alumina pellets maintained at the temperature noted for each test. A high rate of boil-up was maintained to keep the amount of 1,3-dichlorobutane conversion below 10% per pass. The center part of the distillation column was kept at 125° C. and the head temperature was maintained at 70–80° C. The products from the distillation column were collected and analyzed by gas chromatography. The products contained 0.65 mole of 4-chlorobutene-1, 0.52 mole of 1,3-butadiene, 0.05 mole of 3-chlorobutene-1, and 0.07 mole of 1-chlorobutene-2, and 0.10 mole of unreacted 1,3-dichlorobutane. This represents a 50 mole percent yield of 4-chlorobutene-1 based on the reaction product distribution.

*Example 2*

Example 1 was repeated except that 1,3-dibromobutane was charged to the flask and subsequently converted to 4-bromobutene-1. The reaction zone contained a 25 cc. bed of the palladium-on-alumina pellets and was maintained at 290° C. The center part of the distillation column was kept at 290° C., and the head temperature was maintained at 74–76° C. The products contained 0.32 mole of 4-bromobutene-1, 0.21 mole of 1,3-butadiene, 0.1 mole of 3-bromobutene-1, 0.22 mole of 1-bromobutene-2, and 0.01 mole of unreacted 1,3-dibromobutane. This represents a 37 mole percent yield of 4-bromobutene-1.

*Example 3*

In this example, a single pass reactor was used which consisted of a flask mounted in the heating mantle, and a packed vertical glass column mounted in the flask, as described above. The top of this column was connected directly to the recovery receiver and trap. There was no provision for a recycle stream to the flask. To this flask was charged 188.5 grams of 1,3-dichlorobutane. This material was vaporized, preheated, and passed through a 100 cc. bed of 0.5% rhodium on ⅛ in. alumina pellets maintained at 408° C. The total contact time was about 1 sec. The products, as analyzed by gas chromatography were: 0.148 mole of 4-chlorobutene-1, 0.113 mole of 1,3-butadiene, 0.028 mole of 3-chlorobutene-1 and 1-chlorobutene-2, and 1.4 mole of unreacted 1,3-dichlorobutane. This represents a 51.3 mole percent yield of 4-chlorobutene-2.

*Example 4*

The single pass reactor equipment described in Example 3 was used in this example. The reactor section was packed with 70 cc. of ⅛ in. zinc oxide pellets heated to 305° C. The preheater section was maintained at 275° C. Over a 30 minute period, 0.685 mole of 1,3-dichlorobutane were vaporized and passed through the zinc oxide catalyst bed. The products, as analyzed by gas chromatography were: 0.0342 mole of 4-chlorobutene-1, 0.0145 mole of 1,3-butadiene, 0.010 mole of 3-chlorobutene-1 and 1-chlorobutene-2, with the remainder being unreacted 1,3-dichlorobutane. This represents a 58 mole percent yield of 4-chlorobutene-1.

*Example 5*

Example 1 was repeated with 506 grams of 1,3-dichlorobutane charged to the vaporizer flask. This material was vaporized and passed through a 70 cc. bed of ⅛ in. activated alumina pellets. The still head temperature was maintained at 70–90° C. with the still bottoms being returned to the vaporizer flask. It was found necessary to raise the reactor temperature from 250° C. to 400° C. over a 4.5 hour period to maintain the reaction rate due to deactivation of the catalyst. The products were collected and analyzed by vapor chromatography and found to contain .555 mole of 4-chlorobutene-1, 0.108 mole of 1-chlorobutene-2, 0.061 mole of 3-chlorobutene-1, 0.322 mole of butadiene and 0.225 mole of unreacted 1,3-dichlorobutane. Based on product distribution, this represents a 37 mole percent yield of 4-chlorobutene-1.

Example 6

This example illustrates the dehydrohalogenation of the next higher homologue of 1,3-dichlorobutane, namely, 1,4-dichloropentane. To the flask of the recycle dehydrohalogenation apparatus of Example 1 was charged 270 grams of 1,4-dichloropentane. The material was vaporized and preheated to 180° C. and then passed through a 75 cc. bed of 0.5% rhodium on ⅛ in. alumina pellets maintained at 166° C. The still conditions were adjusted so the head temperature was maintained at 95–100° C.; materials boiling at a higher temperature being recycled back to the vaporizer flask. The products from the distillation column were collected (wt.=164 g.) and analyzed by gas chromatography. The product composition was 18.5% 5-chloropentene-1 and 68.7% 5-chloropentene-2, together with small amounts of several other by-products, including 1,4-pentadiene, 1,3-pentadiene, and 4-chloropentene-2. The latter compound is formed by 1,4 re-addition of HCl to 1,3-pentadiene. A residue of 17.5 grams remained in the vaporizer and 65 grams of HCl gas was collected in a water scrubber. This gives a material balance of 91%.

As shown by this example, when 1,4-dichloropentane is dehydrohalogenated according to the process conditions specified for this invention, the major product is 5-chloropentene-2 and not 5-chloropentene-1. In other words, the dehydrohalogenation of the next higher homologue of 1,3-dichlorobutane follows the course expected according to the prior art. That is, the eliminated hydrogen atom was lost from the carbon atom bearing the least number of hydrogen atoms to form an internal double bond, as predicted by Saytzeff's Rule discussed hereinbefore. In view of these results, it is quite unexpected that 1,3-dihalobutane may be dehydrohalogenated according to the present invention to obtain a preponderance of 4-halobutene-1, which has the terminal double bond, instead of a halobutene-2 having an internal double bond, as would be expected from the teachings of the prior art.

This invention has been described in considerable detail. However, since there are many variations which can be made in these details without parting from the spirit and scope of this invention, it is to be understood that this invention is not intended to be limited except as defined by the appended claims.

What is claimed is:

1. The process comprising contacting a 1,3-dihalobutane of the formula

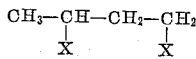

wherein X is a halogen selected from the group consisting of chlorine and bromine, with a dehydrohalogenation catalyst from the group consisting of palladium on alumina, rhodium on alumina, zinc oxide and activated alumina at a temperature between about 200° and 385° C., and thereafter separating from the resulting reaction products a 4-halobutene-1 of the formula

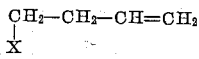

wherein X is a halogen selected from the group consisting of chlorine and bromine.

2. The continuous process comprising contacting a 1,3-dihalobutane of the formula

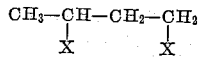

wherein X is a halogen selected from the group consisting of chlorine and bromine, with a dehydrohalogenation catalyst selected from the group consisting of palladium on alumina, rhodium or alumina, zinc oxide and activated alumina in a reaction zone at a temperature between the boiling point of the said 1,3-dihalobutane and 500° C., removing the resulting reaction products from the said reaction zone and thereafter separating from the resulting reaction products a 4-halobutene-1 of the formula

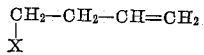

wherein X is a halogen selected from the group consisting of chlorine and bromine.

3. The process of claim 2 wherein the contact time between the said 1,3-dihalobutane and the said catalyst is sufficient to effect a conversion of only 0.1 to 10% by weight of the said 1,3-dihalobutane.

4. The process of claim 2 wherein the said halogen is chlorine and the temperature is from 200 to 300° C.

5. The process of claim 4 wherein the said catalyst is a member of the group consisting of rhodium on alumina and palladium on alumina.

6. The process of claim 2 wherein the said halogen is bromine and the temperature is from 320 to 385° C.

7. The process of claim 6 wherein the said catalyst is a member of the group consisting of rhodium on alumina and palladium on alumina.

8. The continuous cyclic process comprising contacting a 1,3-dihalobutane of the formula

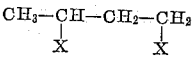

wherein X is a halogen selected from the group consisting of chlorine and bromine, with a dehydrohalogenation catalyst from the group consisting of palladium on alumina, rhodium on alumina, zinc oxide and activated alumina in a reaction zone at a temperature between about 200° and 385° C., the contact time between the said 1,3-dihalobutane and the said catalyst being sufficient to effect a conversion of only 0.1 to 10% by weight of said 1,3-dihalobutane, removing the resulting reaction products from the said reaction zone, separating from the resulting reaction products a 4-halobutene-1 of the formula

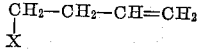

wherein X is a halogen selected from the group consisting of chlorine and bromine, and then returning the unconverted 1,3-dihalobutane to the said reaction zone.

9. The process of claim 8 wherein the said halogen is chlorine and the temperature is from 200 to 300° C.

10. The process of claim 9 wherein the said catalyst is a member of the group consisting of rhodium on alumina and palladium on alumina.

11. The process of claim 8 wherein the said halogen is bromine and the temperature is from 320 to 385° C.

12. The process of claim 11 wherein the catalyst is a member of the group consisting of rhodium on alumina and palladium on alumina.

References Cited by the Examiner

UNITED STATES PATENTS

| | | | |
|---|---|---|---|
| 2,038,593 | 4/1936 | Muskat | 260—654 |
| 2,070,609 | 2/1937 | Muskat | 260—696 X |
| 2,207,760 | 7/1940 | Russell | 260—680 |
| 2,310,523 | 2/1943 | Groll et al. | 260—680 |
| 2,343,107 | 2/1944 | Cass et al. | 260—680 |
| 2,343,108 | 2/1944 | Cass | 260—680 |
| 3,230,181 | 1/1966 | Lester | 260—654 X |

LEON ZITVER, *Primary Examiner.*

K. V. ROCKEY, *Assistant Examiner.*